US006795137B1

(12) United States Patent
Whitted et al.

(10) Patent No.: US 6,795,137 B1
(45) Date of Patent: Sep. 21, 2004

(54) METHODS AND APPARATUS FOR IMPLEMENTING TRANSMISSIVE DISPLAY DEVICES

(75) Inventors: J. Turner Whitted, Pittsboro, NC (US); Eric Horvitz, Kirkland, WA (US); Michael J. Sinclair, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/299,521

(22) Filed: Apr. 26, 1999

(51) Int. Cl.[7] .............................................. G02F 1/1335
(52) U.S. Cl. .......................................... 349/68; 349/67
(58) Field of Search ................................. 349/67–69, 5, 349/58, 61, 64, 114; 250/214; 345/102

(56) References Cited

U.S. PATENT DOCUMENTS

| | | | | |
|---|---|---|---|---|
| 3,838,565 A | * | 10/1974 | Carlyle ........................... | 58/50 |
| 3,838,909 A | * | 10/1974 | Fitzgibbons ................ | 350/160 |
| 3,966,303 A | * | 6/1976 | Yamamoto .................. | 350/160 |
| 4,289,383 A | | 9/1981 | Schwarzschild ............ | 350/334 |
| 4,298,249 A | * | 11/1981 | Gloor et al. ................. | 350/338 |
| 4,635,128 A | * | 1/1987 | Toyoda ....................... | 348/794 |
| 5,760,760 A | | 6/1998 | Helms ........................ | 345/102 |
| 5,777,704 A | * | 7/1998 | Selker ......................... | 349/58 |
| 5,786,801 A | | 7/1998 | Ichise ........................ | 345/102 |
| 5,818,553 A | | 10/1998 | Koenck et al. ................ | 349/61 |
| 6,184,946 B1 | | 2/2001 | Ando et al. .................... | 349/42 |

OTHER PUBLICATIONS

"Chapter 1: The Growing World of LCDs" and other pages totaling 46 pages, downloaded from: http://www.sharp.co.jp/sc/library/lcd_e, Oct. 23, 1998.

* cited by examiner

Primary Examiner—Dung Nguyen
(74) Attorney, Agent, or Firm—Microsoft Corp.

(57) ABSTRACT

Energy efficient transmissive and transreflective display devices are described. Ambient light from a natural or artificial source is used to replace and/or supplement light normally supplied by a backlight. This is done by directing ambient light to the rear of a transmissive display panel. A window, light tunnel, or a reflective surface located in the rear or top of a display device may be used to direct the ambient light to the back of the display panel. A translucent diffuser and/or diffuse reflector are used to diffuse the ambient light to reduce the chance of bright spots appearing on the display. Additional energy efficiency is achieved by using one or more photo-sensors to detect the amount of light, incident on the front and/or rear of a display panel and by automatically adjusting the backlight intensity as a function of photo-sensor output. In this manner, backlight intensity can be minimized while maintaining the viewability of images shown on the display. In such an embodiment, energy savings are achieved as compared to devices which use fixed backlight intensity settings in a variety of light conditions. Control of the power supplied to a display's backlight in accordance with the present invention can reduce electrical energy consumption and prolong the amount of time a portable device can be used before its batteries need to be recharged.

2 Claims, 6 Drawing Sheets

METHODS AND APPARATUS FOR IMPLEMENTING TRANSMISSIVE DISPLAY DEVICES

FIELD OF THE INVENTION

The present invention relates to methods and apparatus for implementing display devices and, more particularly, to methods and apparatus for reducing the amount of electrical power required by display devices, e.g., transmissive and/or transreflective liquid crystal display (LCD) devices.

BACKGROUND OF THE INVENTION

Displays are found in numerous commercial and consumer devices. Because of various physical characteristics, flat panel displays tend to be favored over cathode ray tube (CRT) displays in many applications where size, weight and/or power consumption is of concern.

Flat panel displays, including e.g., liquid crystal display (LCD) devices come in many different sizes. Small LCD devices are used in applications ranging from calculators and wristwatches to point-of-sale terminals and gas pumps. Larger LCD devices are found in portable computers, desktop computer displays, and numerous other devices.

Figure 1:
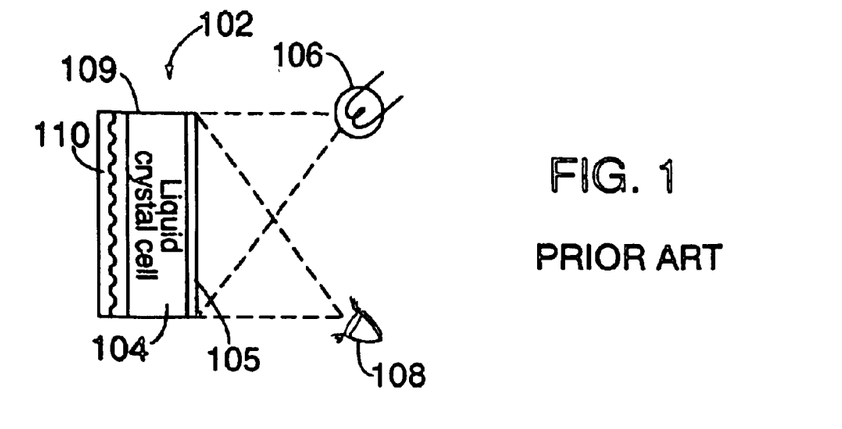
FIG. 1 illustrates a known reflective LCD device.

Known LCDs are frequently implemented as reflective, transmissive, or transflective devices. A reflective LCD, as the name implies, uses reflection to illuminate the display. FIG. 1 illustrates a known reflective LCD 102. The reflective LCD 102 includes a closed housing 109 which contains a liquid crystal cell 104 and a reflector 110. A screen 105 made of, e.g., glass, is used to seal the front of the closed housing 109. Light from an external light source 106 passes through the screen 105, liquid crystal cell 104 and is then reflected back towards the eye 108 by the reflector 110 located behind the liquid crystal cell 104. The liquid crystal cell includes, for example, front and rear polarizers with a layer of liquid crystal material sandwiched there between. The light absorptive characteristics of the liquid crystal cell are varied by changing an electric field applied to the layer of liquid crystal material. Thus, by varying an electric field images may be displayed on the LCD 102 and perceived by a viewer represented by the eye 108.

Reflective LCDs are generally the least expensive type of LCD and use the least amount of power. Reflective LCDs rely on ambient, e.g., external natural or artificial light sources for illumination. Accordingly, reflective LCDs do not include a backlight. Such displays operate satisfactory in well lit locations. However, because they lack an internal light source they are difficult to read in low light conditions which are often encountered indoors. For this reason, reflective displays have not found wide spread use in portable computers or other devices which may need to be used in low light conditions.

Figure 2:
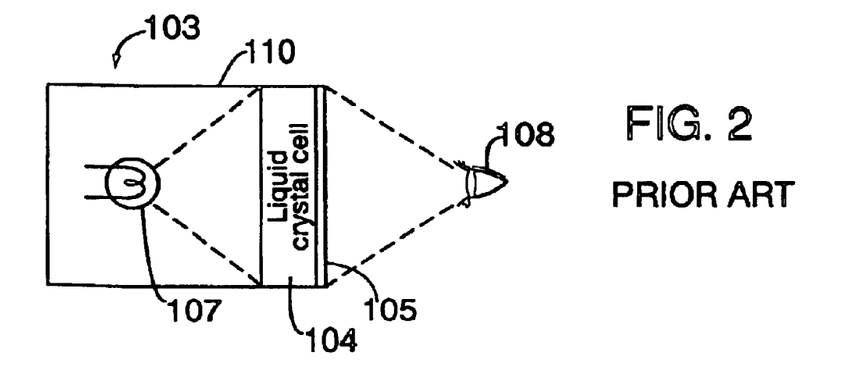
FIG. 2 illustrates a known transmissive LCD device.

Transmissive LCDs such as transmissive LCD 103, illustrated in FIG. 2, use an internal light source 107, referred to as a backlight, for illumination. In the transmissive LCD 103, the backlight 107 is enclosed in an opaque housing 110 behind the liquid crystal cell 104 and display screen 105. Light from the backlight 107 passes through the liquid crystal cell 104 and display screen 105 before being perceived by a viewer, represented by the eye 108. Since the housing 110 is opaque, natural and/or ambient light from behind the housing is prevented from entering the liquid crystal cell from the rear of the housing.

Transmissive displays are well suited for use indoors under artificial lighting. For this reason, transmissive LCDs are frequently used in, e.g., portable computers and lab instruments. One drawback to transmissive displays is that they consume a relatively high amount of power due to the use of the backlight. In portable devices such as battery powered notebook computers, minimizing power consumption is important. Power consumption by the backlight is a major factor in determining the amount of time portable computers can be used between recharges.

Many portable computers include a brightness control which allows the intensity of the backlight used in a transmissive display to be manually adjusted by a system user. While manually adjusting the display brightness to the minimum setting which is acceptable to the user for a particular set of room conditions can maximize the time before the computer needs recharging, users are not accustomed to adjusting the brightness of their displays each time they move to a different room or ambient lighting conditions change. To allow for a transmissive display to be used in a wide range of conditions, the brightness of the display is normally set to a value which exceeds the brightness required for normal room conditions, e.g., so that the display can be used in higher than normal lighting conditions without having to adjust the brightness. Unfortunately, such intensity settings tend to waste power which, as discussed above, is a limited resource in the context of most portable devices.

Since the amount of power delivered by batteries is often a function of their size and thus weight, it is desirable to minimize power consumption requirements in portable devices to allow for longer periods of use between battery recharges and/or the use of smaller, lighter, batteries. It is desirable that any methods and apparatus directed to power conservation be at least partially automated so that a user need not make display adjustments each time lighting conditions change.

In addition to relatively high power consumption, another disadvantage of the known transmissive LCD 103 is that such displays are usually hard to read in direct sunlight. The difficulty in reading such displays in direct sunlight arises from the fact that incident sunlight reflected from the display screen 105 can be quite bright compared to the intensity of the light, originating from the backlight 107.

While some manufacturers of transmissive LCDs have incorporated high output backlight to enable out of doors use of transmissive displays, the relatively high power consumption of such devices renders them unsuitable for most battery powered applications.

Figure 3:
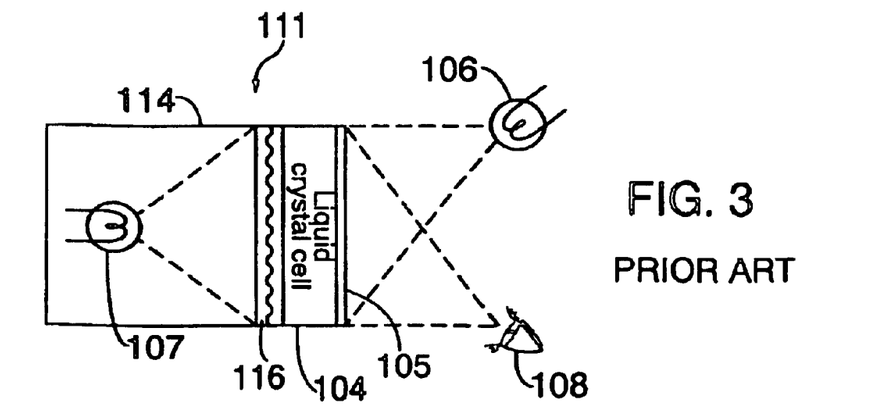
FIG. 3 illustrates a known transreflective LCD device.

Another type of known LCD device is the transflective LCD 111 illustrated in FIG. 3. Transflective LCD 111 combines features of the reflective and transmissive LCDs discussed above. As illustrated, a transflective LCD 111 includes a liquid crystal cell 104, partially transmissive reflector 116 and a backlight 107. The transflective display components are enclosed in an opaque housing 114 which is sealed in the front with a screen 105. Behind the screen 105 is the liquid crystal cell 104, transmissive reflector 116 and backlight 107. Because the housing 114 is opaque, it prevents external, e.g., natural or ambient light from entering from the rear of the housing.

In the transmissive display 111, the reflector is normally a white or silver translucent material that reflects some of the ambient light entering from the front, i.e., viewing side or surface, of the display 106 while still allowing light from the backlight 107 to pass through. Transflective LCD 111 is useful in a wide range of lighting conditions. For this reason, LCD 111 is frequently used where a display must function in both day and night light conditions, e.g., in gas station pump displays. Transflective displays suffer from some of the same power consumption problems, associated with the use of a backlight, discussed above in regard to transmissive displays. In addition, transflective displays tend to have relatively poor contrast ratios since partially transmissive reflector 116 must be partially transparent to let light from the backlight through.

In view of the above discussion it is apparent that there is a need for improved displays, e.g., LCD displays, which can be viewed easily in a wide range of light conditions. It is desirable that at least some of the new displays be capable of implementation without a backlight and the power consumption associated therewith.

From the above discussion, it is also apparent that there is a need for methods and apparatus directed to reducing the amount of power utilized by displays which incorporate backlights.

SUMMARY OF THE PRESENT INVENTION

The present invention is directed to methods and apparatus for reducing the amount of electrical power consumed by display devices, e.g., transmissive and/or transreflective liquid crystal display (LCD) devices.

One feature of the present invention is directed to automatically controlling the intensity of a backlight as a function of ambient, e.g., external, light levels. In accordance with this feature of the present invention, the ambient light intensity at the front, e.g., viewing surface, of an LCD is sensed using a sensor and the intensity of the backlight is automatically adjusted as a function of the sensed light intensity.

By adjusting backlight intensity as a function of ambient light conditions backlight power consumption can be minimized while maintaining a satisfactory level of image visibility over a wide and possibly changing range of light conditions.

Another feature of the present invention is directed to conserving power through the use of ambient light which is allowed to enter a display device through a non-viewing surface, e.g., the rear of a display, as opposed to the viewing surface, e.g., front of the display where the screen is located. In one such embodiment of the present invention, a transparent window is located in a non-viewing side, e.g., the rear, of a display device behind a liquid crystal cell.

In some embodiments a backlight is used to supplement the light received via the opening in the rear of the display device. By positioning the back of the display device so that it is directed towards a natural or artificial light source found in the device's surroundings, the need for a light from a powered backlight is reduced or eliminated.

In one embodiment which utilizes a combination of a backlight and natural light that is allowed to enter through a non-viewing surface, e.g., rear of the display device, a light sensor is included on both the front and rear of the display device. The intensity of the backlight is automatically controlled, as a function of the difference between the light intensity measured at the front and rear of the display device. In this manner, backlight power consumption is automatically adjusted and controlled so that the backlight outputs the minimum amount of power required to achieve a user selected degree of visibility. With suitable rear lighting, the backlight may, in such an embodiment, be turned completely off.

One feature of the present invention is directed to allowing a user of a display device to set the brightness of the display and have that level maintained under a variety of light conditions without requiring further operator intervention. This result is achieved in various embodiments by allowing the user of the display to set the desired brightness and then automatically adjusting backlight intensity, as a function of sensed light intensity, so that the display will be perceived as having the degree of brightness to which the display was set despite changing light conditions.

In one embodiment, a user may select normal and power saving brightness settings. The power saving brightness setting is less than the normal brightness setting, e.g., the minimal brightness which the user considers adequate for viewing. The user can select, e.g., via a display switch or software command, either of the two supported brightness settings. For example, when on long trips the power saving brightness setting may be selected while during office use, the normal brightness setting may be used. In accordance with the present invention the selected brightness setting is maintained as a function of one or more sensed light intensity levels. Thus, the desired brightness setting can automatically be maintained under a wide range of light conditions without requiring user adjustments of brightness levels.

Numerous additional features, embodiments, and advantages of the methods and apparatus of the present invention are set forth in the detailed description which follows.

DETAILED DESCRIPTION

As discussed above, the present invention is directed to methods and apparatus for reducing the amount of electrical power required by display devices, e.g., LCDs.

In the description which follows, for the purposes of brevity, elements which are the same as, or similar to one another, will be identified using the same reference numerals. In addition, arrows will be used to illustrate rays of light which may be emitted by, e.g., a natural or artificial light source.

Figure 4:
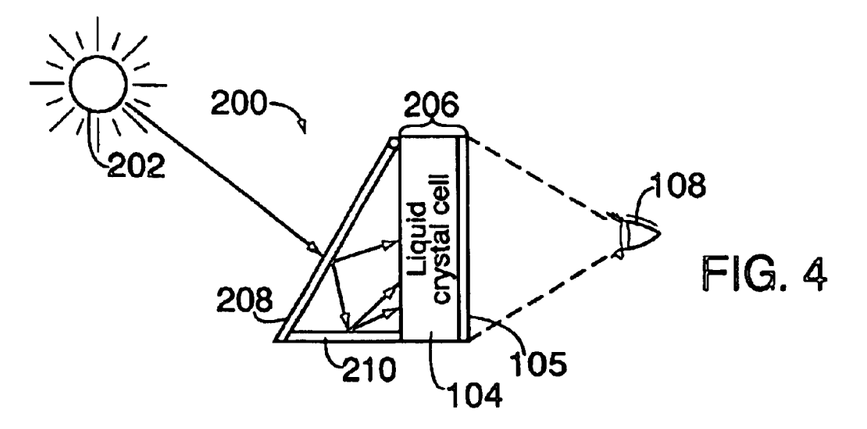
FIGS. 4–6 illustrate transmissive displays implemented in accordance with the present invention.

FIG. 4 illustrates a transmissive display device 200 implemented in accordance with one embodiment of the present invention. The display 200 comprises, e.g., a transmissive display panel 206 which comprises a protective outer layer, i.e., the screen 105, and an inner layer, implemented as a liquid crystal cell 104. A translucent diffuser 208 and diffuse reflector 210 are positioned behind the display panel 206 in an angular arrangement to form a back portion and a bottom portion, respectively, of the display 200. Sides (not shown) coated with a reflective material may be used to seal the remaining rear portion of the display 200 positioned behind the liquid crystal display 206. Note that in use, a viewer represented by the eye 108 is positioned in front of the display panel 206. The rear of the display 200 is positioned facing the highest intensity ambient light source present, e.g., the sun 202. In such an arrangement, ambient light is allowed to pass through the translucent diffuser 208 and is reflected by the diffuse reflector 210 onto the non-viewing side, e.g., rear, of the display panel 206.

In such an arrangement, the high intensity ambient light passing through the display panel 206 from the rear should be greater than the amount of ambient light reflected from the viewing side, e.g., front, of the display panel 206. Such an embodiment allows for viewing of the display in high intensity sunlight and other high intensity ambient light conditions without the need for a powered backlight. The use of the translucent diffuser 208 and diffuse reflector 210 help to eliminate bright spots by diffusing the ambient light before it passes through the display panel 206.

It is contemplated that a wide variety of plastic and non-plastic materials may be used to implement the translucent diffuser 208 and diffuse reflector 210. In one embodiment, a translucent plastic material was used as the translucent diffuser 208 while a white sheet of paper was used as the diffuse reflector 210.

As will be appreciated, in portable applications it is desirable that a display be capable of being stored in a relatively small space. Specifically, in portable computer applications it is generally desirable that a display be relatively thin, e.g., no more than a few inches in thickness, and be capable of being folded down flat, e.g., over a computer keyboard.

Figure 5:
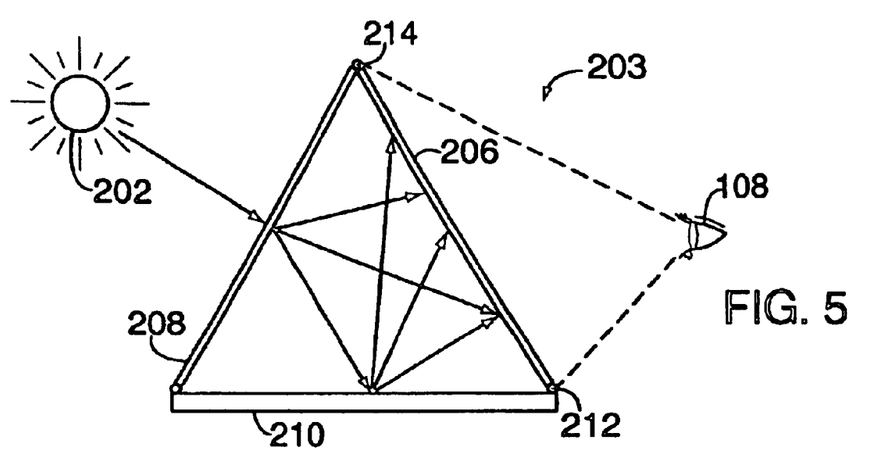
Figure 6:
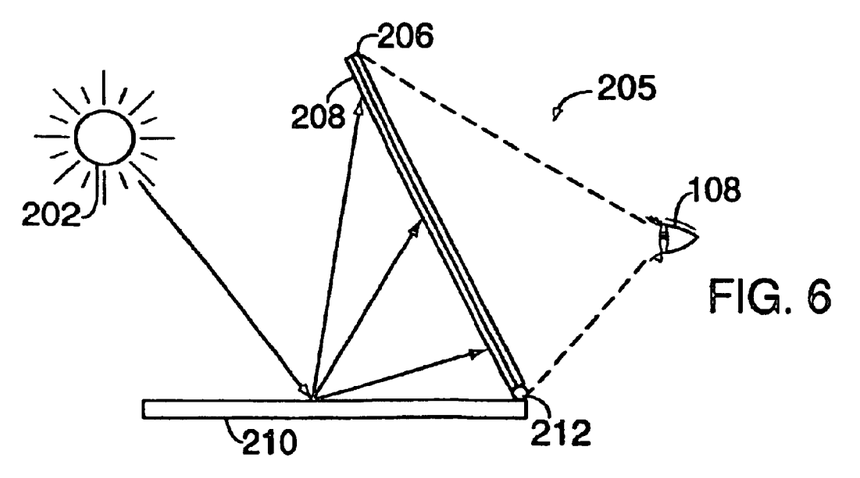

FIGS. 5 and 6, illustrate embodiments wherein displays 203 and 205 of the present invention, are implemented using hinged panels capable of being folded to form a flat assembly for storage and transport purposes.

In the FIG. 5 embodiment, the diffuse reflector 210 is attached to the bottom of the display screen 206 via a first hinge 212 while the rear translucent diffuser 208 is attached to the top of the display panel 206 via a second, e.g., top, hinge 214. FIG. 5 illustrates the display 203 deployed for use. When deployed, the display 203 assumes, when viewed from the side, a triangular shape similar to that of the display 200. In order to make the display 203 easy to deploy, sides which would otherwise be used to close off the cavity formed by the diffuser 208, diffuse reflector 210 and display panel 206 are omitted. When not in use, the translucent diffuser 208 may be folded back on top of the display panel 206 which can then lie flat against the diffuse reflector 210. Alternatively, the translucent diffuser 214 can be positioned between the display 206 and the diffuse reflector 210 to form a flat assembly with the diffuse reflector 210 on the bottom, diffuser 208 in the middle and the display panel 206 on top.

FIG. 6 illustrates another display 205 which can be folded flat. In this embodiment, the second hinge 214 is eliminated and the translucent diffuser 208 is secured directly to the back of the display panel 206. A first hinge 212 is located at the intersection of the bottom of the combined display panel/diffuser assembly and the diffuse reflector 210. The first hinge 212 is used to allow the folding down of the display panel assembly to form a flat display for storage and/or transportation purposes.

The displays illustrated in FIGS. 4, 5 and 6 eliminate the need for a backlight through the use of ambient light for illumination purposes. However, in low light conditions, or in conditions where light is generally of uniform intensity in all directions, use of a supplemental light source, e.g., a backlight, may be desirable. Accordingly, the use of a backlight to supplement ambient lighting is contemplated and employed in various embodiments of the present invention.

In various embodiments, the display panels 206 used in the FIGS. 4–6 embodiments are mounted in housings which support the display panel 206 and provide a point of attachment for the first hinge 212. In such an embodiment, the housing may be considered part of the display panel 206.

Figure 7:
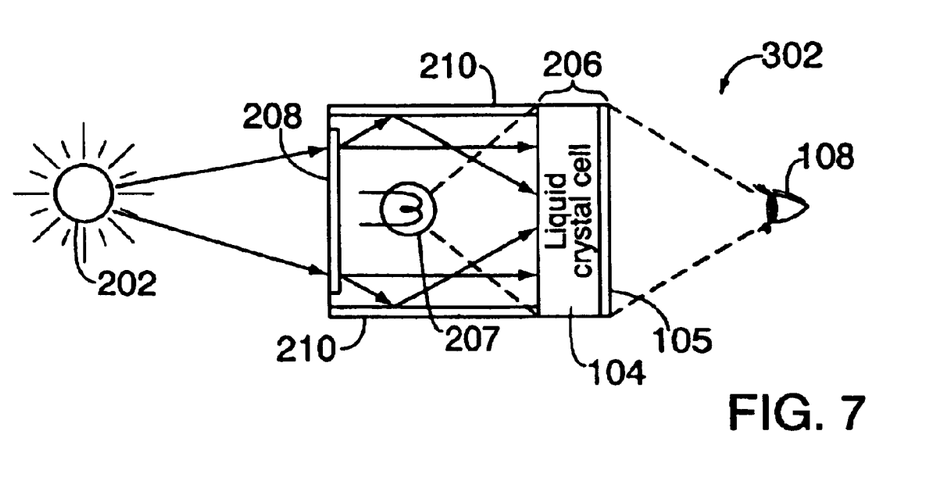
FIG. 7 illustrates a transmissive display of the present invention which incorporates a backlight.

FIG. 7 illustrates a back lit transmissive display 302 implemented in accordance with one embodiment of the present invention. The display 302 includes a display panel 206 behind which a backlight 207 is located. The backlight 207 is located in a housing which utilizes diffuse reflectors 210 for sidewalls and a translucent diffuser 208 to close the rear of the housing. The diffuse reflectors 210 act as a light pipe and serve to direct ambient light entering through the rear translucent diffuser 208 so that it passes out through the display panel 206. While the translucent diffuser 208 is illustrated directly behind the liquid crystal display, use of the light pipe formed by the diffuse reflectors 210 allows for the translucent diffuser to be positioned at various locations that are not necessarily located directly behind the display panel 206. For example, the translucent diffuser 208 may be positioned at the top of a device incorporating the display 302 or at a position off-set from the display panel 206.

The techniques of the present invention involving the use of ambient light can be applied to virtually any type of device which uses a backlight.

Figure 8:
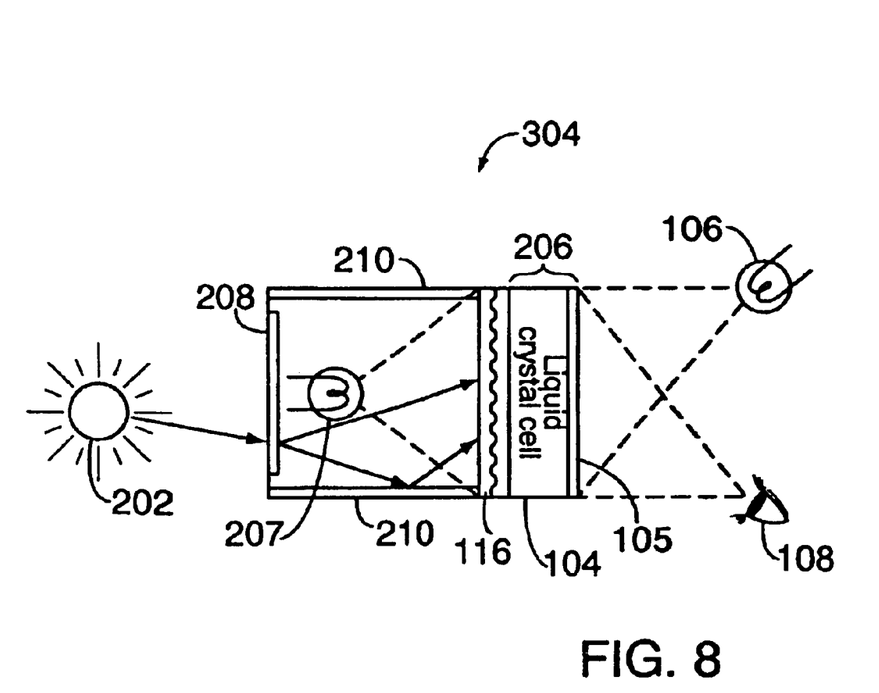
FIG. 8 illustrates a transreflective display implemented in accordance with another exemplary embodiment of the present invention.

FIG. 8 illustrates a transreflective display 304 implemented in accordance with the present invention. Note how in the FIG. 8 embodiment, the solid (non-translucent) rear of the known transreflective display 111 is replaced with translucent material 208 to produce the display 304. In the FIG. 8 embodiment, the translucent material 208 allows natural or artificial ambient light to supplement or replace the light produced by the backlight 207.

Figure 9:
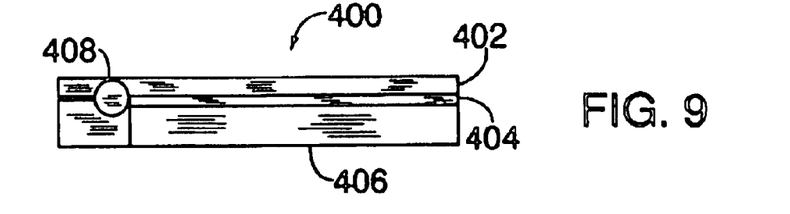
FIGS. 9 through 11 illustrate a portable computer incorporating a display implemented in accordance with the present invention.

FIG. 9 illustrates a portable computer device 400 implemented in accordance with the present invention. The computer device includes a base portion 406 for housing a CPU, memory, a keyboard, etc, and a lid portion including first and second panel assemblies 402, 404. A hinge 408 is used to connect the lid portion of the computer 400, to the base portion 406. The hinge 408 allows the lid portion to be raised, e.g., when the computer is in use, and lowered e.g., for storage and/or during transport.

Figure 10:
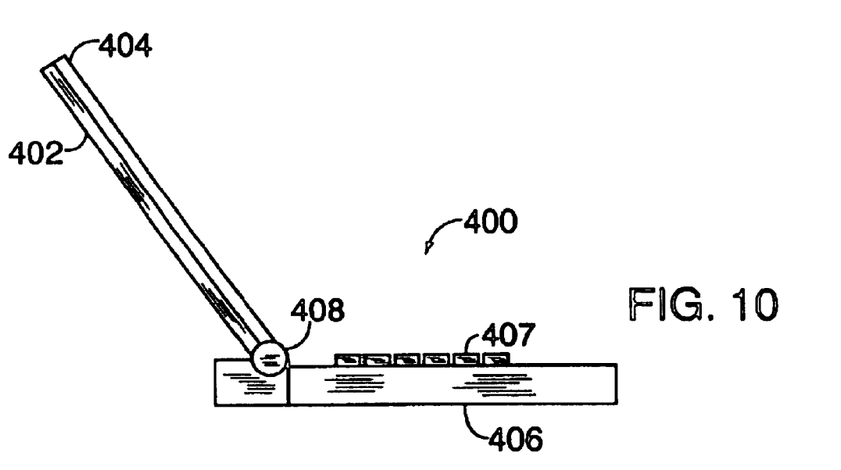

FIG. 10 illustrates the computer system 400, with the lid portion in the raised position. In this position, the keyboard 407 included in the base portion 406 is both visible and accessible to a user of the computer 400.

Figure 11:
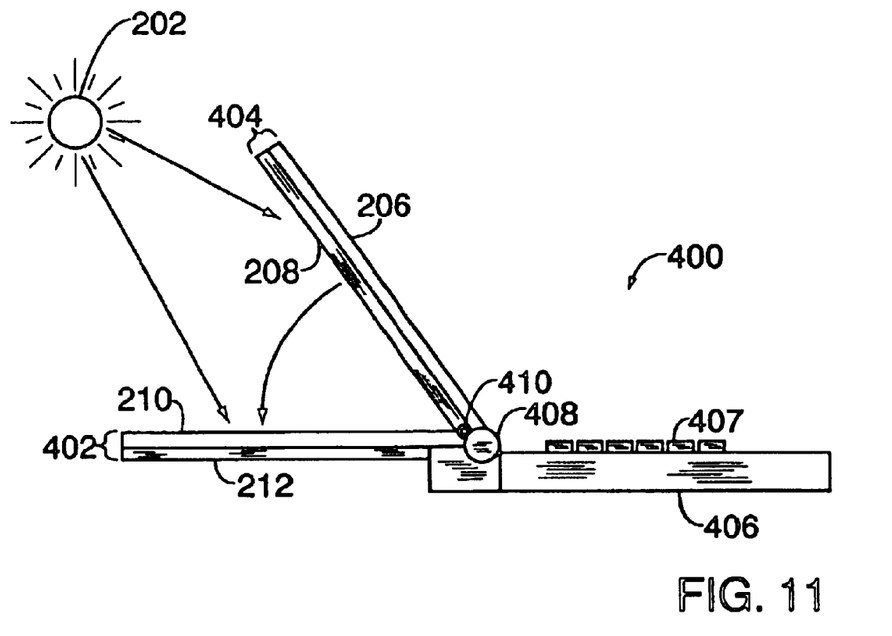

FIG. 11 illustrates the computer system 400 arranged for use. In the FIG. 11 arrangement the upper portion of the lid 402 has been lowered to a fully open position. The upper portion 402 is positioned in FIG. 11 so that it extends parallel to the base portion 402. The upper lid panel 402 includes an inner diffuse reflector 210 and an outer protective layer 212 made of an opaque material. The lower panel 404 of the lid comprises an outer diffuser panel 208 which is secured to an inner display panel 206.

The upper panel 402 of the lid is positioned at an angle relative to the upper lid panel 402 so that ambient light falling on the upper lid panel will be reflected by the diffuse reflector 210 through the diffuser panel 208.

In order to supplement the natural illumination supplied to the rear of the display panel 206, in the FIG. 11 embodiment, an optional backlight 410 is incorporated into the diffuser panel 208. The backlight is positioned so that its light output is directed through the display panel 206 as opposed to being directed out the back.

As discussed above, minimizing power consumption by a backlight is important in order to prolong the amount of time a battery powered device can operate before the battery needs to be charged or replaced.

In most portable computer devices, backlight intensity is controlled by a user accessible control, e.g., a potentiometer. In most known computer devices, the brightness of the backlight is fixed at the intensity determined by the user. As ambient light conditions change, e.g., the intensity of light impinging on the front of the display screen decreases, it may be possible to decrease the intensity of the backlight, and thus save power, without having a substantial negative impact on the readability of the displayed images. Unfortunately, most portable computer users are unwilling to manually adjust the brightness of the display each time ambient light conditions change resulting in the wastage of power. Power wastage occurs from setting the brightness control higher than is required so that frequent adjustments to a display's brightness need not be made.

The inventors of the present application recognized that by automating all or part of the backlight intensity adjustment process, to take into consideration changes in ambient light conditions, power savings could be achieved. In accordance with one power saving feature of the present invention a photo-sensor is used to measure the intensity of light impinging on at least a portion of the front of a display screen. The result of this light measurement is then used to control backlight intensity. By measuring ambient light conditions and adjusting backlight intensity, e.g., at power up and/or periodically during use, the intensity of the backlight is adjusted so that it does not significantly exceed a level required to display images in a manner deemed suitable by a user of the system. A user may indicate the desired degree of contrast between the incident light and the light output by a display by manually adjusting a brightness control. By automatically adjusting backlight intensity as a function of ambient light conditions, power savings can be achieved. User selectable normal and power saving modes of operation are easily supported. In the power saving mode a minimal backlight intensity is maintained as a function of detected light conditions. During normal mode operation a somewhat brighter screen appearance is maintained.

Figure 12:
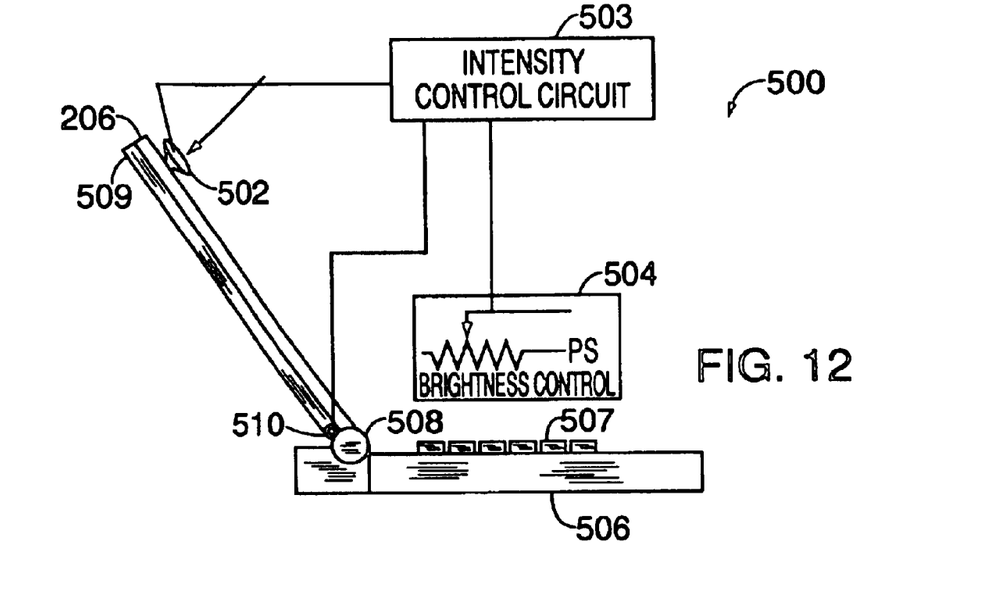
FIG. 12 illustrates a portable computer including a light sensor and intensity control circuit implemented in accordance with another embodiment of the present invention.

FIG. 12 illustrates a portable computer 500 implemented in accordance with one exemplary embodiment of the present invention. The portable computer 500 comprises a base portion 506, keyboard 507 and a hinge 508. The hinge 508 attaches a display comprising a backlight 510, diffuser 509, transmissive display panel 206 and a photo-sensor 502. The photo-sensor 502 is mounted on the front of the display panel 206 so that the intensity of light falling on the front of the display panel 206 can be measured.

The portable computer 500, further comprises a backlight intensity control circuit 503 and a brightness control circuit 504 which are used to control the amount of power supplied to the backlight 510 and thus the intensity of light supplied to the rear of the display panel 206. The intensity control circuit may be implemented using software routines executed by a CPU included in the base portion 506. The brightness control circuit 504 may be implemented as a potentiometer which has one terminal coupled to a power supply represented by the symbol PS and another terminal coupled to the intensity control circuit 503. A user may adjust the potentiometer, e.g., by turning a knob, thereby adjusting the brightness control signal supplied to the intensity control circuit 503.

The intensity control circuit 503 determines the amount of power supplied to the backlight 510 as a function of the output of the photo-sensor 502 and the received brightness control signal. The intensity of the backlight 510, as a function of the photo-sensors and brightness control outputs, is adjusted so that the perceived brightness of the display will remain generally constant despite changes in ambient light conditions. Accordingly, when the output of the photo-sensor 502 indicates an increase in the intensity of the ambient light striking the screen 206, the power to the backlight 510 will be increased. As the intensity of the ambient light striking the screen 206 decreases, the intensity control circuit decreases the power supplied to the backlight 510 and thus the intensity of the light output therefrom. A minimum power level is set, e.g., pre-programmed, for the backlight 510 to insure that the display will be readable in low light conditions.

In one embodiment, even if the output of the photo-sensor 502 indicates little or no incident light, the intensity control circuit 503 does not lower the power output to the backlight 510 below a preselected threshold to insure that in dark or dimly lit conditions, images on the display panel 206 will remain visible. In such an embodiment, intensity control circuit 503 maintains backlight light output between a minimum threshold level and full intensity as a function of the output of the photo-sensor 502 and the brightness control circuit 504.

Figure 13:
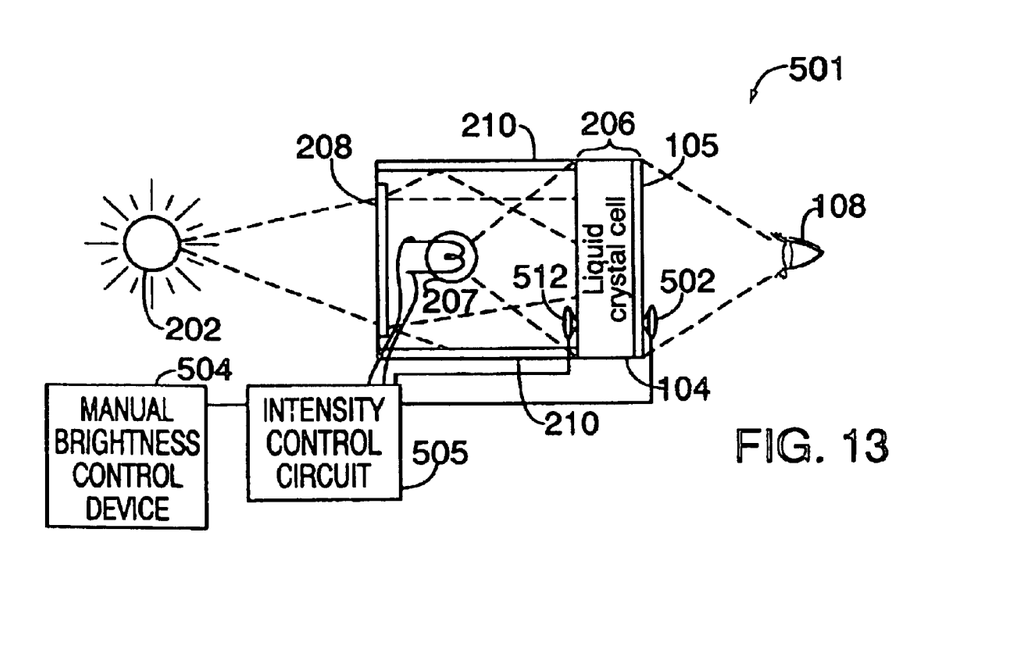
FIG. 13 illustrates a transmissive display device of the present invention which includes a plurality of light sensors and an intensity control circuit.

FIG. 13 illustrates a transmissive display 501 which uses natural or ambient light, in accordance with the present invention, to supplement light provided, when required, by a backlight 207. The structure of the display 501 is similar to that of the display 302. However, to insure energy efficient control of the backlight 207, the display 501 includes a front photo-sensor 502, a rear photo-sensor 512, an intensity control circuit 505 and a manual brightness control device 504. In the FIG. 13 embodiment, the intensity control circuit 505 receives signals indicating the amount of light shining on the rear of the display panel 206 from the rear photo-sensor 512 and the amount of light shining on the front of the display panel 502. In order to maintain the brightness at the user selected level, indicated by the output of the control device 504, the intensity control circuit adjusts the amount of power supplied to the backlight 207 so that the difference between the signals generated by the front and rear photo-sensors 502, 512 remains constant, or relatively constant, despite changes in ambient light conditions.

While the rear photo-sensor is shown inside the display housing so that it measures the light, including the light from the backlight 207, impinging on the rear of the display panel 206, it is contemplated that the intensity control may be performed as a function of a measurement of light impinging on the exterior rear of the housing, e.g., on or near the diffuser 208. In one particular embodiment, backlight control is achieved using signals received from a front photo-sensor 502 and a rear photo-sensor 512 positioned on the exterior of the display 501. Such an embodiment is possible since the amount of light which will be generated by the backlight 207, given a particular power input, can be predicted with reasonable certainty in most monitors.

Figure 14:
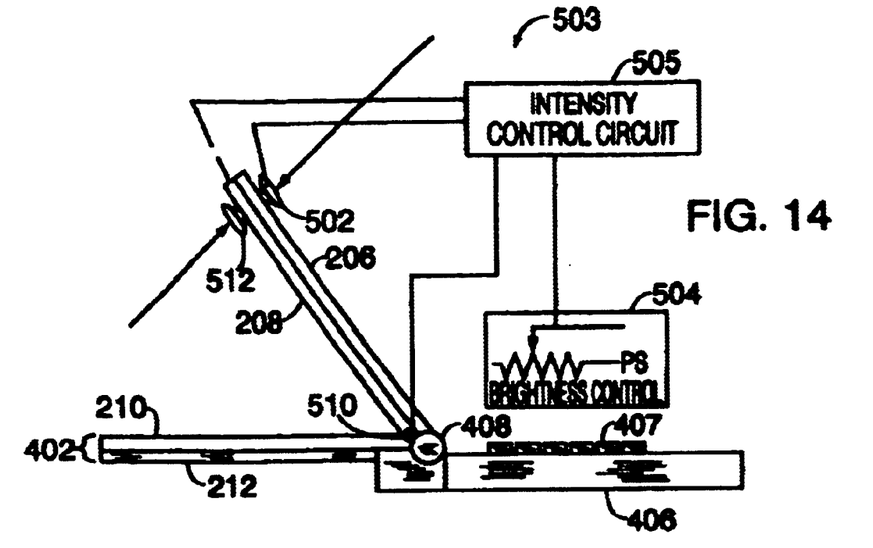
FIG. 14 illustrates a portable computer implemented using a plurality of light sensors and an intensity control circuit.

FIG. 14 illustrates a portable computer system 503 which is similar in construction to the previously described computer system 400. Unlike the computer system 400, the computer system 503 includes front and rear display panel sensors 502, 512, a backlight intensity control circuit 505 and a manual brightness control circuit 504. The various components operate as described above to adjust backlight intensity as a function of the measured intensity of ambient light incident on the rear of the display panel and the measured intensity of ambient light on the front of the display panel. In the FIG. 14 embodiment, the photo-sensor 512 is mounted on an exterior portion of transmissive diffuser 208 or on a portion of a display housing 504 (see FIG. 15) used to mount the panels 206, 208. Accordingly, in such an embodiment, the photo-sensor 512 detects ambient light reflected by the reflector 210 towards the rear of the display panel 206.

Figure 15:
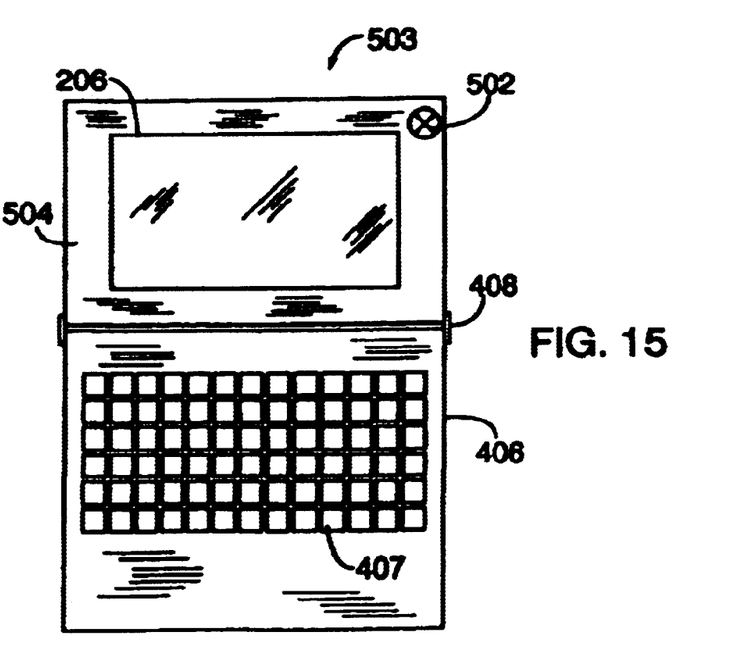
FIG. 15 is a frontal view of the portable computer illustrated in FIG. 14.

FIG. 15 is a frontal view of the computer system 503 illustrated in FIG. 14. From this view, a display housing 504 used to mount the panels 206, 208 and photo-sensor 502, is visible. In the FIG. 15 embodiment, the display housing 504 is used to mount the front photo-sensor 502.

While the photo-sensors 502, 512 have been illustrated in some figures as protruding from the surfaces on which they are mounted, it is to be understood that they may be flush mounted to facilitate folding and storage of the display device into which they are incorporated. In addition, it is to be understood that the intensity control circuit 505 and brightness control circuit 504 may be located internal to the housing 406.

It should also be noted that the computer system 503 may include a central processing unit (CPU), a memory device and various software routines which are stored in the memory device and executed by the CPU. The intensity control circuit 505 may be implemented using software which controls the intensity of the backlight 510 as a function of the various input signals which are shown as being supplied to the intensity control circuit 505. In fact, the intensity control function may be incorporated into, and/or be implemented as, operating system routines executed by the CPU included in the computer 500.

While numerous exemplary embodiments of the methods and apparatus of the present invention have been described above, it will be apparent to one of ordinary skill in the art, in view of the above description of the invention, that numerous additional embodiments are possible without varying from the scope of the invention.

What is claimed is:

1. A transreflective display device, comprising:
   a housing;
   a display panel mounted in a first location in said housing, the display panel including first and second surfaces, the second surface being a non-viewing surface;
   a transmissive reflector located behind said non-viewing surface of the display panel;
   a diffuser for diffusing ambient light originating from outside the housing to provide diffused-ambient light inside the housing;
   two or more devices for directing at least some of the diffused-ambient light through the transmissive reflector and the non-viewing surface of the display panel, the two or more devices forming sidewalls; and
   a backlight mounted inside the housing behind the transmissive reflector for supplementing the ambient light directed to the rear portion of the display panel; the transmissive reflector being located between the backlight and second display panel surface.

2. The display device of claim 1 in which the first display panel surface is a front viewing surface.

* * * * *